United States Patent [19]

Clausen et al.

[11] Patent Number: 5,753,120
[45] Date of Patent: May 19, 1998

[54] TUBULAR FILTER ELEMENT HAVING A SEALING ARRANGEMENT WITH A HOUSING POST

[75] Inventors: Michael D. Clausen, Turlock; Russell D. Jensen, Modesto, both of Calif.

[73] Assignee: Parker-Hannifin Corporation, Cleveland, Ohio

[21] Appl. No.: 720,989

[22] Filed: Oct. 15, 1996

Related U.S. Application Data

[60] Provisional application No. 60/007,139, Nov. 1, 1995.
[51] Int. Cl.[6] .................................................. B01D 27/08
[52] U.S. Cl. ........................ 210/438; 210/439; 210/440; 210/443; 210/450; 210/455; 210/497.01
[58] Field of Search ................................. 210/438, 439, 210/440, 443, 450, 455, 497.01

[56] References Cited

U.S. PATENT DOCUMENTS

| | | | |
|---|---|---|---|
| 3,388,800 | 6/1968 | MacGregor | 210/439 |
| 4,257,890 | 3/1981 | Hurner | 210/439 |
| 4,943,352 | 7/1990 | Lefebvre et al. | 210/439 |
| 5,614,091 | 3/1997 | Janik et al. | 210/438 |

Primary Examiner—W. L. Walker
Attorney, Agent, or Firm—Christopher H. Hunter

[57] ABSTRACT

A filter comprises a housing having a container and cover which enclose a filter element. The container includes a hollow central post which extends upwardly from the base of the container. The upper end cap for the filter element includes a base supporting the filter media and a cylinder extending downwardly within the central cavity of the filter media. A first seal is provided around the periphery of the upper end cap to seal the intersection between the container and the cover. A second seal on an upwardly-extending flange on the upper end cap seals against a corresponding downwardly-extending flange on the cover. A plurality of slots in the base of the upper end cap provide a flow path from an inlet on the cover to the upstream surface of the filter media. The lower end cap also includes a base supporting the filter media and a cylinder extending upwardly within the cavity of the filter media and defining a central lower opening for receipt of the central post. The cylinders of the upper and lower end caps axially overlap and provide a radially inwardly-facing groove which receives a third O-ring seal. The third O-ring provides a seal between the filter element and the central post of the filter element. A bolt is received within the hollow central post of the container and extends upwardly through an opening formed in the cover. A nut tightened down on the bolt fastens the cover and the container together. The head of the bolt includes a surface geometry which cooperates with the surface geometry of the bore in the central post to prevent the bolt from rotating as the nut is tightened down.

25 Claims, 4 Drawing Sheets

TUBULAR FILTER ELEMENT HAVING A SEALING ARRANGEMENT WITH A HOUSING POST

This application claims the benefit of U.S. Provisional Application No. 60/007,139 filing date Nov. 1, 1995.

FIELD OF THE INVENTION

The present invention relates to devices for filtering and separating fluids.

BACKGROUND OF THE INVENTION

Fuel filters having a housing enclosing a filter element are well know. The filter housing commonly comprises a container for the filter element, and a cover which can be separated from the container. The filter element can be removed from the housing and disposed of, or cleaned, at regular intervals. The filter element commonly includes a tubular filter media supported at both ends by a pair of end caps. The end caps typically have an annular base supporting the tubular media, and at least one of the end caps includes a central opening for fluid flow into or out of the central cavity of the filter media. When the filter element is located within the housing, fluid is either directed around the periphery of the element, radially inward into the cavity of the filter media, and then axially outward through the central opening in the end cap; or alternatively, introduced through the central opening in the one end cap, passes radially outward through the filter media, and then collected at the outer periphery of the element. When the filter media becomes clogged with contaminants and/or particulate matter, the cover and container can be separated and the filter element can be removed and replaced, or cleaned.

As can be appreciated by those skilled in the art, various housing and filter element designs have been developed in an attempt to provide simple structures which are easy to assemble and provide relatively easy access to a spent filter element for replacement (or cleaning) thereof. Zinga, U.S. Pat. No. 5,389,246; Shah, U.S. Pat. No. 5,049,269; Tuffnell, U.S. Pat. No. 3,662,895; Offer, U.S. Pat. No. 3,395,808; and Firth, U.S. Pat. No. 3,847,819, illustrate just a few of the filter designs which have been developed over the years with these features.

While the above filter designs might be appropriate for particular applications, it is believed that there is a demand in the industry for a further improved filter structure which is (i) simple in design, (ii) easy to assemble, and (iii) provides ready and easy access to a spent filter element.

SUMMARY OF THE INVENTION

The present invention provides a filter having a novel and unique housing and filter element for the housing. The simple structure of the housing and filter element is such that these components can be easily assembled together, and easy access is provided to the filter element such that a spent element can be easily removed and replaced (or cleaned).

According to the principles of the present invention, the housing for the filter includes a container with an open end that is designed to receive the filter element, and a cover which is fitted on the container to enclose the filter element. The container preferably has a cylindrical shape with a hollow central post extending upwardly from the base of the container toward the cover. The cover for the housing includes an outer peripheral lip which is designed to meet with the open end of the container, and a short central sleeve which receives the central post of the container. The cover and container are fixedly secured together by an elongated bolt which is inserted from the bottom of the container through the hollow post. The bolt extends upwardly through the sleeve and through an opening in the upper cover, and a nut is tightened down on the distal end of the bolt to tighten the cover against the container. The inner surface of the hollow post has a surface configuration which cooperates with the surface configuration on the head of the bolt to prevent the bolt from rotating in the post when the nut is tightened down. This surface configuration can also be replicated on the outer surface of the post up to about the midpoint of the post.

The filter element for the housing preferably includes a tubular filter media which is supported at either end by end caps. An upper end cap for the filter media has an annular base which supports the upper end of the filter media, and a central cylinder portion which extends axially downward within the central cavity of the filter media. The outer peripheral edge of the base includes a circumferential groove which receives an O-ring seal. The O-ring on the base is located between the cover and the outer container and provides a fluid-tight seal between the cover and the container. A plurality of slots are also provided on the base at a radial location between the peripheral edge of the base and the peripheral edge of the filter media. The slots provide a flow path through the base from an inlet passage on the cover to the outer peripheral region of the filter media. The base also includes an axially upwardly-extending annular flange which has a radially-outwardly facing groove. A second O-ring seal is received within this groove and is designed to seal against a corresponding axially downwardly-extending annular flange on the cover.

The lower end cap for the filter media also preferably has an annular base which supports the bottom end of the filter media, and a cylinder portion which extends axially upwardly through the central cavity of the filter media. The upwardly-extending cylinder from the lower end cap, and the downwardly-extending cylinder from the upper end cap, cooperate to define a cylindrical cavity which receives the central post extending upwardly from the base of the housing. The lower cylinder preferably axially overlaps a portion of the upper cylinder such that a groove is formed along the inner surface of the cylindrical cavity. A third O-ring seal is disposed in this groove to seal the filter element against the outer surface of the central post, at a location along the post which is above the outer surface configuration on the post (i.e., above the midpoint of the post). The upper cylinder also includes an outwardly-projecting flange which engages the top edge of the lower cylinder to axially orient the lower cylinder with respect to the upper cylinder. Finally, a series of slots are formed circumferentially around the upper cylinder to provide a flow path through the cylinder from the inner central region of the filter media to a fluid outlet passage on the cover.

The filter is assembled by initially locating the filter media within the container with the outer peripheral seal on the upper end cap being located along the open upper lip of the container. The cover and container are then fitted together to enclose the filter media, with the peripheral lip of the cover being sealed to the container by the peripheral seal. Likewise, the seal carried by the overlapping cylinders seals against the central post, and the seal on the annular flange of the upper end cap seals against the downwardly-extending annular flange on the cover. The bolt extending upwardly through the hollow post in the lower end of the housing extends through the opening in the upper cover, and a nut is threaded down on the upper end of the bolt to secure the cover to the container. The nut can be easily removed and the cover and container separated to provide ready and easy access to a spent filter cartridge by reversing the above steps.

As described above, the present invention thereby provides a filter with a unique housing and filter element which are simple in design, easy to assemble, and provide easy access to a spent filter cartridge. Further features and advantages of the present invention will be apparent upon reviewing the following detailed description and attached drawings.

DETAILED DESCRIPTION OF THE PREFERRED EMBODIMENT

Figure 1:
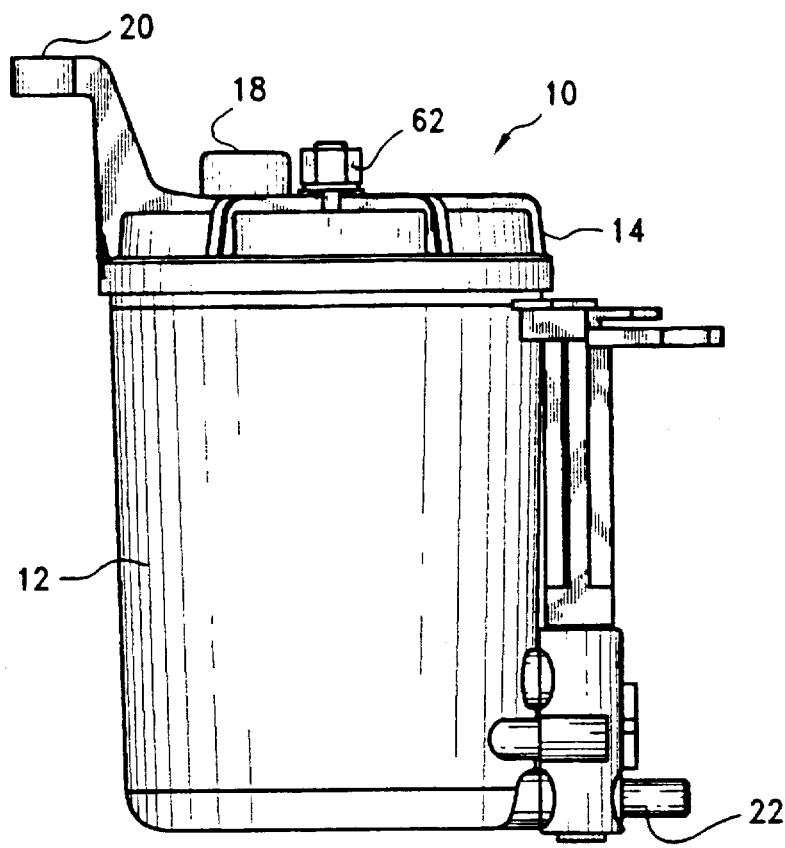
FIG. 1 is a perspective side view of a filter constructed according to the principles of the present invention.
Figure 2:
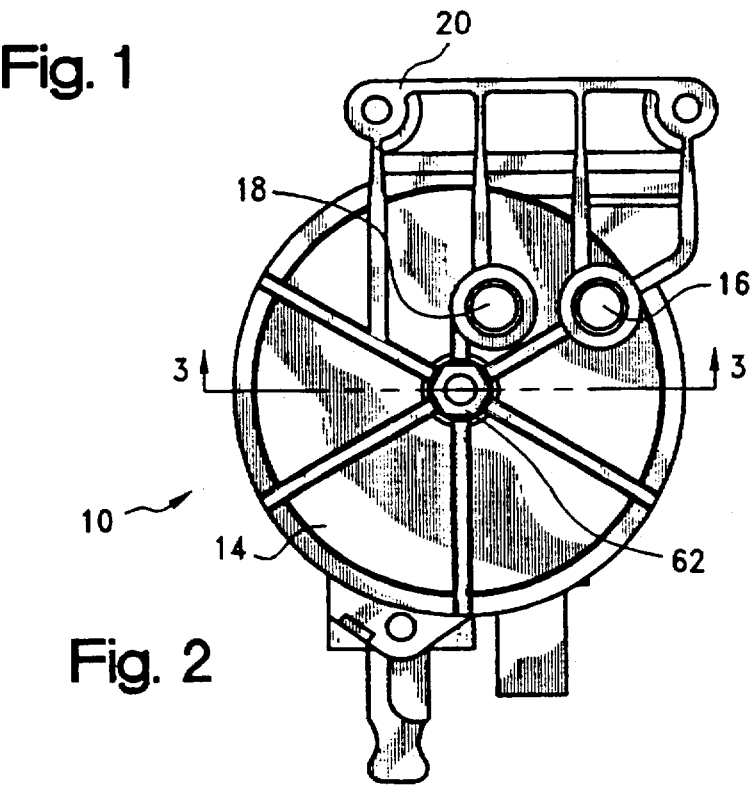
FIG. 2 is a perspective top view of the filter of FIG. 1.

Referring to the drawings, and initially to FIGS. 1 and 2, a filter constructed according to the principles of the present invention is indicated generally at 10. The filter includes a housing comprising a cylindrical container 12 and an annular upper cover 14. The filter is designed to be located within a fluid system, and to this end, includes a fuel inlet 16 and a fuel outlet 18. The filter further includes conventional attachment means 20 formed integrally with cover 24. Such attachment means preferably includes a support flange which can be fastened at an appropriate location within the fluid system. Additional conventional structure for the filter includes a drain 22 to drain water from the lower end of container 12. Container 12 and cover 14 are formed from appropriate materials, e.g., aluminum, using conventional techniques, e.g., drawing, stamping or casting.

Figure 3:
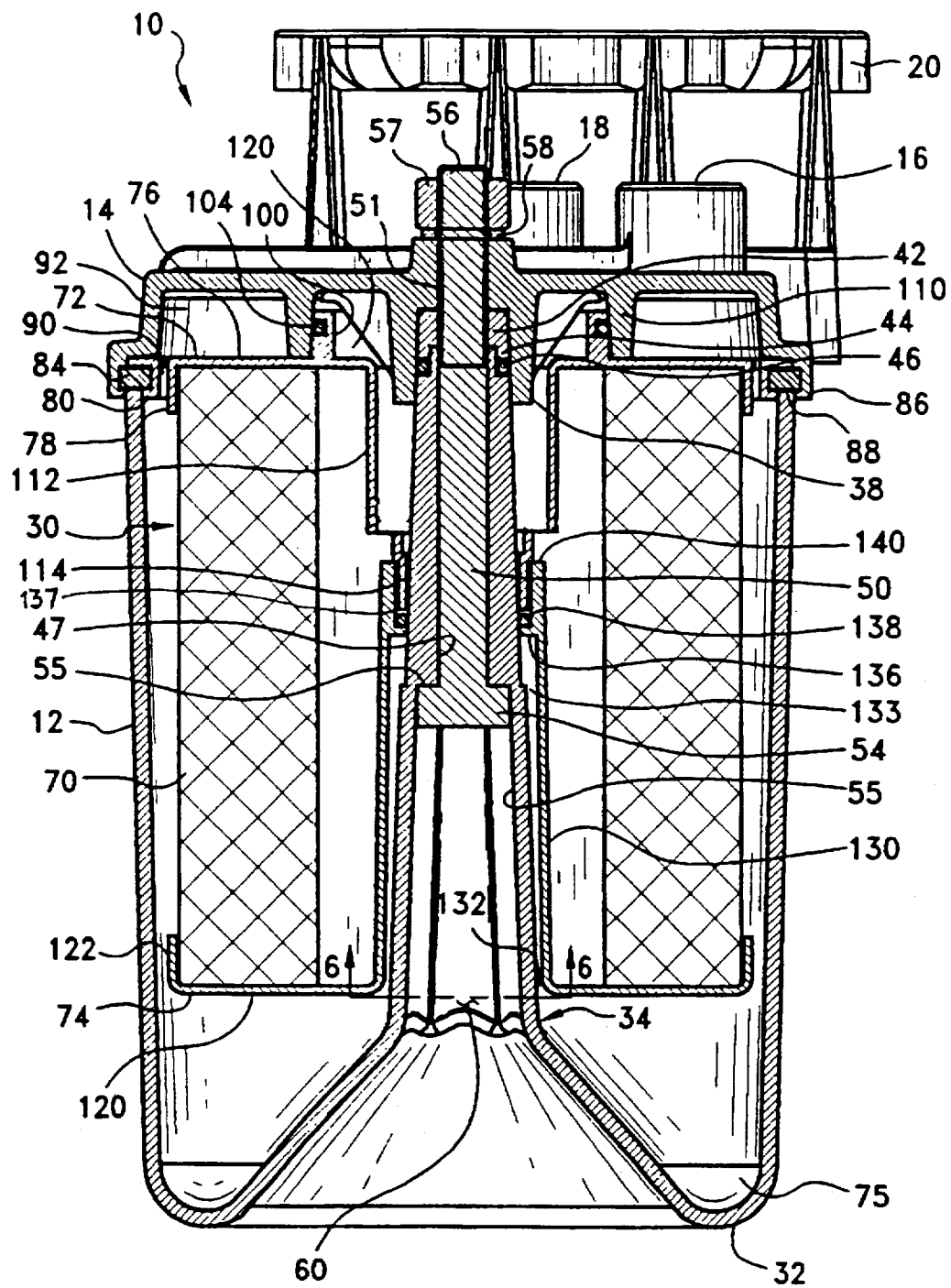
FIG. 3 is a cross-sectional side view of the filter taken substantially along the plane described by the lines 3—3 of FIG. 2.

Referring now to FIG. 3, the filter includes an unique filter element, indicated generally at 30, which is located within container 12 and enclosed within the container by cover 14. Fluid entering inlet 16 passes through filter element 30 and the element filters or separates contaminants and/or particles in the fluid. The fluid then passes through fluid outlet 18 to the fluid system. As will be described below, when filter element 30 becomes clogged with contaminants and/or particles, the filter element can be easily removed from container 12 by separating the container from cover 14. The filter element is then replaced or cleaned, reinserted within the container, and the cover and container are then easily reattached together.

For these purposes, container 12 includes a base 32 having a central cylindrical post 34 formed in one piece with the base and extending axially upward and centrally within filter element 30. Post 34 extends upwardly through the filter element to the top of the container 12 where it is received within a downwardly-extending annular sleeve 38 formed in one piece with cover 14. An annular retainer 42 is disposed between the upper distal end of post 34 and the inside surface of sleeve 38. A downwardly-extending annular flange 44 on retainer 42 and an annular shoulder (unnumbered) at the upper distal end of post 34 define an annular channel for an O-ring type elastomeric seal 46. O-ring 46 provides a fluid-tight seal between the outer surface of post 34 and the inner surface of sleeve 38.

Post 34 includes an axially-extending central bore 47. A fastening device 50, e.g., a bolt, is received within the bore 47 and extends upwardly through this bore, through sleeve 38 and through a corresponding opening 51 formed in cover 14. Bolt 50 includes an enlarged head 54 which is received in a counterbore 55 formed axially along a portion of the length of bore 47. Head 54 engages an annular shoulder 55 between bore 47 and counterbore 55 to prevent bolt 50 from moving further axially upward through bore 37. Preferably, annular shoulder 55 is formed at or about the midpoint of post 34. The upper distal end 56 of bolt 50 has external threads which cooperate with internal threads on retainer 42 to retain bolt 50 within post 34, and to normally prevent the bolt from slipping out of the post. Bolt 50, seal 46 and retainer 42 can be preassembled with the container at the manufacturing facility.

A nut 57 having internal threads is then tightened down on the distal end 56 of bolt 50 to retain cover 14 on container 12. An appropriate O-ring-type seal 58 can be disposed around bolt 50 between cover 14 and nut 62. Preferably, counterbore 55 in post 34 has an inner surface 60 with a geometric configuration which matches the geometric configuration of head 54 on bolt 50. For example, if head 54 is of a hexagonal shape, then the inner surface 60 of counterbore 55 preferably also has a hexagonal shape. In this manner, when bolt 50 is inserted into bore 47, the geometric shape of the bore prevents bolt 50 from rotating within post 34 when nut 57 is tightened down. Of course, the head of the bolt 50 can have other geometric configurations, such as square, as should be known to those of ordinary skill in the art, with the inner surface 60 of bore 47 being configured appropriately to achieve the same results described above.

A geometric surface configuration can also be provided on the exterior surface of post 34, up to a point about midway up the post 34 toward cover 14. For example, the surface configuration of the post can match the surface configuration of counterbore 60. The reasons for this geometric surface configuration on the exterior surface of the post will be discussed below. The remaining upper portion of post 34 preferably has a smooth annular surface.

In the above-described manner, cover 14 can be easily attached to, and separated from container 12, such that ready and easy access to filter element 30 is provided. When filter element 30 is located within container 12 and the container is fitted with the cover, the thread end of fastening bolt 50 extends through the opening 51 in cover 14. When nut 57 is tightened down around this end, the cover 14 and container 12 are secured together. To remove filter element 30, nut 57 is removed and the container is separated from the cover. As indicated previously, retainer 42 holds bolt 50 within canister 12 after nut 57 is removed from the bolt to prevent the bolt from slipping out of the post. The cooperation between the matching surfaces of counterbore 55 and head 54 prevent bolt 50 from rotating when nut 62 is tightened down.

The filter element 30 for the filter preferably comprises a tubular filter media 70 of an appropriate efficiency and material. Filter media 70 can be formed in any conventional manner from conventional materials which are appropriate for the particular filtering process. Preferably, filter media 70 is a pleated filter media. In addition, if the filter media is a water-coalescing media, water collected on the exterior surface of the media can trickle downward into a cup-shaped cavity 75 provided at the lower end of the filter container, for draining through drain port 22.

Figure 4:
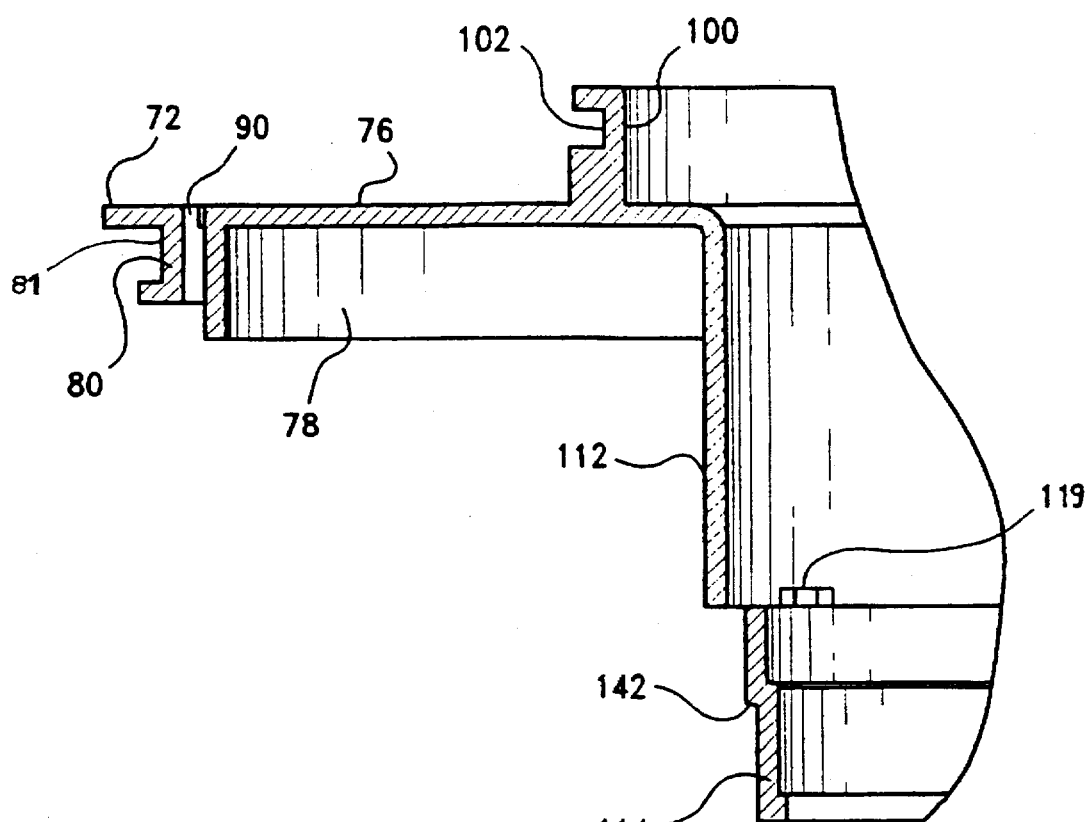
FIG. 4 is an enlarged, partial cross-sectional view of the upper end cap for the filter of FIG. 3.

In any case, as shown in FIGS. 3 and 4, the filter media is disposed between an upper end cap 72 and a lower end cap 74. Upper end cap 72 has a downwardly-facing cup-shaped design which supports the upper end of the filter media 70. Specifically, end cap 72 includes a flat annular base 76 supporting the upper end of the filter media, and an outer annular flange 78 which extends a short distance axially downwardly along the outer surface of the filter media. Appropriate adhesive is disposed between the upper end of the filter media and base 76. End cap 72 further includes a second, downwardly-extending flange 80 which forms a radially-outwardly facing groove 81 (FIG. 4) for an O-ring type elastomeric seal or gasket 84. Seal 84 extends circumferentially around the periphery of base 76, and is received between the outer peripheral lip 86 of cover 14 and an upper lip 88 extending around the open upper end of container 12. Peripheral lip 86 has an inner stepped configuration which contacts both base 76 and seal 84 to provide a fluid-tight seal between cover 14 and container 12.

Figure 5:
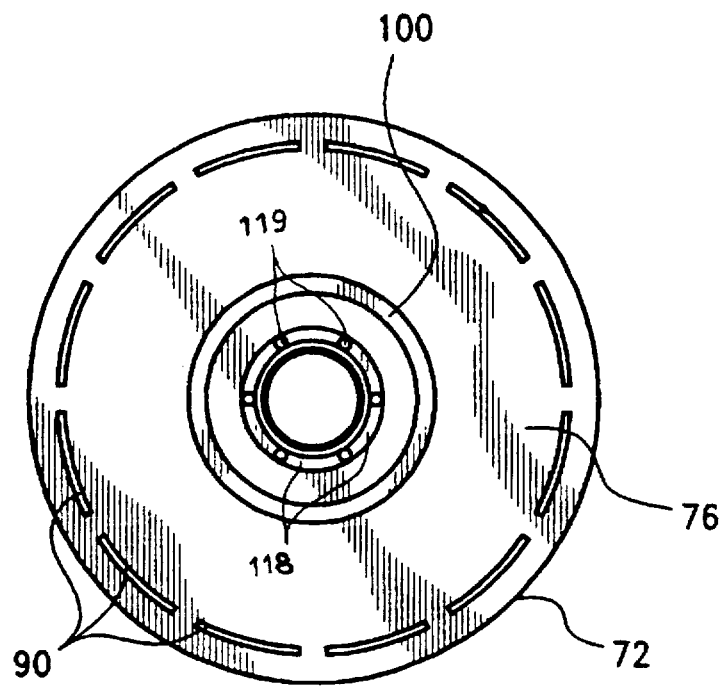
FIG. 5 is a top view of the upper end cap of FIG. 3.

Referring now to FIG. 5, base 76 further includes a plurality of slots or apertures 90 which extend around the circumference of the base in a generally even, spaced-apart manner. The number and spacing of slots 90 depends upon the particular fluid flow requirements, as can be appreciated by those skilled in the art. As can be seen in FIGS. 3 and 4, slots 90 provide a flow path from an upper fluid cavity 92 in cover 14 to the region bounding the outer peripheral surface of filter media 70. Inlet port 16 opens into upper fluid cavity 92 to thereby provide a flow path from the inlet to the upstream side of the filter media.

Referring again to FIGS. 3 and 4, base 76 of the upper end cap further includes an annular flange 100 which extends upwardly from the upper surface of base 76. Flange 100 includes a radially-outwardly facing annular channel 102 (FIG. 4) which receives an O-ring-type elastomeric seal 104. O-ring 104 is designed to seal against a corresponding downwardly-extending annular flange 110 formed on the lower surface of cover 14 for providing a fluid-tight seal therebetween. Flange 110 on cover 14 has a slight outward taper from the distal end of the flange to the cover, which bears against and slightly compresses seal 104 for a fluid-tight fit. Preferably, the downwardly-extending flange 110 abuts the upper surface of base 76.

Upper end cap 72 further includes a cylinder 112 which extends downwardly within the central portion of filter element 30, and is preferably formed in one piece with base 76. Cylinder 112 is illustrated in FIG. 3 as being spaced radially inward from the inner surface of filter media 70, however, the cylinder could also be in contact with the filter media along the inner surface to provide radial support. As can be seen in FIG. 4, cylinder 112 narrows down in a stepped fashion to an annular sleeve 114 at the lower end of the cylinder. Preferably at the junction between cylinder 112 and sleeve 114, a plurality of openings 118 are provided circumferentially around cylinder 112, in equal spaced-apart relation (see e.g., FIG. 4). Openings 118 are defined by radially-extending tabs 119 interconnecting the upper end of sleeve 114 and the lower end of cylinder 112. The number and spacing of openings 118 depends upon the particular fluid flow requirements. Openings 118 provide a flow path between cavity 120 in upper cover 14 and the radially inner surface region of filter media 70. Fluid outlet port 18 in turn opens into cavity 120 to thereby provide a flow path from the downstream side of the filter media to the outlet. It is noted that openings 118 can be formed at other locations on end cap 72 to provide this flow path, for example on base 76 at a point radially-inward from flange 100. Thus, as will be appreciated by those skilled in the art, a complete flow path is provided between inlet port 16 through cavity 92, through apertures 90 in base 76 to the outer peripheral region of the filter media 70, radially inward through the filter media 70 to the inner peripheral region, through openings 118 in cylinder 112 to cavity 120, and then to outlet port 18.

Figure 6:
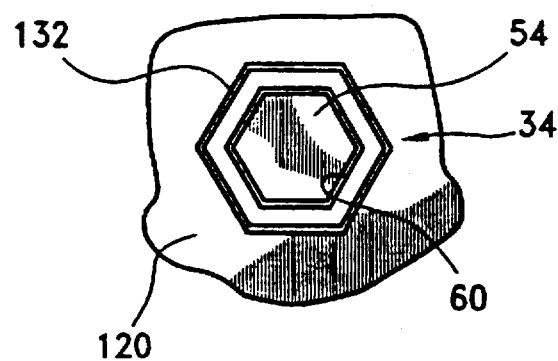
FIG. 6 is a cross-sectional end view of the filter taken substantially along the plane indicated by the lines 6—6 in FIG. 3.

Referring now to FIG. 3, lower end cap 74 preferably also has a cup-shaped design with an annular base 120 for supporting the lower end of filter media 70. An annular flange 122 extends a short distance axially upwardly along the outer surface of the filter media. Appropriate adhesive is also provided between the lower end of the filter media and base 120. Lower end cap 74 further includes a cylinder 130 formed in one piece with base 120 and extending upwardly within the central region of filter element 30. Cylinder 130 is also illustrated as being spaced radially inward from the inner surface of filter media 70, however, the cylinder could likewise be in contact with the filter media to provide radial support thereof. Cylinder 130 defines an lower opening 132 which is sized so as to be closely received around post 34 of canister 12. As illustrated in FIG. 6, opening 132 can have an inner geometric configuration which matches the surface configuration of post 34. For example, if post 34 has an outer hexagonal configuration, then opening 132 can also have a corresponding hexagonal configuration for locating the filter element on the post when the filter element is inserted within the container, and for preventing the filter element 30 from rotating within the container. Post 34 can of course have other outer surface configurations, for example square, with opening 132 having a corresponding configuration which would also prevent rotation of the filter element.

Referring again to FIG. 3, lower cylinder 130 extends upwardly and axially overlaps a portion of the downwardly-extending cylinder 112 to create an internal cylinder indicated generally at 32a, defining a cylindrical cavity 133 for receiving post 34. Preferably, the overlapping portions of lower cylinder 130 and upper cylinder 112 have a tight interference fit which retains the cylinders in fixed relation to one another. Alternatively, or in addition, an appropriate adhesive can be provided between these components to fixedly secure the upper end cap to the lower end cap. Cylinder 130 further includes a radially inwardly-extending annular flange 136, which together with the distal lower end of sleeve 114, defines a radially inwardly-facing groove 13F. An O-ring type elastomeric seal 138 is disposed in this groove. O-ring 138 is designed to provide a fluid-tight seal between cylinders 112 and 130 and the outer surface of post 34 at a location axially above the portion of the post with a geometric surface configuration, that is, preferably above the midpoint of the post. Post 34 preferably has a slight outward taper which bears against O-ring 138 to slightly compress this seal when the filter element is disposed in the container for a fluid-tight fit. It is noted that the upper distal end 140 of lower cylinder 130 abuts an outwardly-extending annular flange 142 (FIG. 4) on the lower cylinder to limit the upwardly axial movement of lower cylinder 130 with respect to upper cylinder 112. Flange 142 therefore serves as an axial stop for cylinder 130 to prevent, e.g., overcompression of O-ring 138.

As such, filter element 30 can be easily inserted within container 12 with O-ring seals 84, 104 and 138 providing appropriate fluid-tight seals against the container and the cover when nut 57 is tightened down on bolt 50. Finally, it is noted that the upper and lower end caps 72, 74 are formed from appropriate material for the fluid application, e.g., plastic, using conventional plastic forming techniques known to those skilled in the art, for example molding or die-casting.

Thus, as described above, the filter of the present invention has a unique housing and filter element which are simple in construction, easy to assemble, and provide easy access to a spent filter element.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims. For example, while the filter described above has been particularly described as having a flow path outside-in through the filter media, it should be apparent to those skilled in the art that the inlets and outlets could be reversed, and the flow path could just as well be inside-out, with the same results.

What is claimed is:

1. A filter element for filtering fluid flowing through a filter housing, the housing including a container with an open upper end, a cover for the open upper end, and a post extending axially upward from a lower end of the container to the cover, said filter element comprising:
    i) tubular filter media having upper and lower ends and circumscribing a central cavity,
    ii) a first end cap disposed at the upper end of said filter media, said first end cap including a first annular base portion supporting the upper end of said filter media and a cylindrical portion extending downwardly within said central cavity of said filter media, a first annular resilient seal disposed about the periphery of the first base portion for providing a fluid seal between the base portion, container and the cover of the filter housing, said first base portion further including an annular flange extending upwardly from said base portion, a second annular resilient seal disposed along a surface of said annular flange for providing a fluid seal between the first end cap and the cover, and at least one aperture formed in said first end cap for providing a fluid path to a radially-outer portion of said filter media, and
    iii) a second end cap disposed at the lower end of said filter media, said second end cap including a second annular base portion supporting the lower end of said filter media and a second cylindrical portion extending upwardly within said cavity of said filter media, said cylindrical portions of said first and second end caps cooperating to define a cylindrical cavity for receipt of the post of the filter housing, and a third seal is disposed along an inner surface of one of said cylindrical portions for providing a fluid seal between the upper and lower end caps and the post of the filter housing.

2. The filter element as in claim 1, wherein said cylindrical portions of said first and second end caps axially overlap.

3. The filter element as in claim 2, wherein said first base portion includes an annular peripheral portion having a first groove for the first seal, said flange on said first base portion having a second groove for the second seal, and said axially-overlapping portions of said cylindrical portions of said first and second end caps defining a third groove for said third seal.

4. The filter element as in claim 3, wherein the other of said cylindrical portions includes a radially-inwardly projecting flange, which together with a lower end of said one cylindrical portion, defines said third groove for said third seal.

5. The filter element as in claim 4, wherein said one cylindrical portion includes a radially-outwardly projecting annular flange which engages an end surface on said other cylindrical portion to prevent the other cylindrical portion from moving axially relative to said one cylindrical portion.

6. The filter element as in claim 1, wherein said at least one aperture formed in said first end cap is disposed between said filter media and said first seal, and said first end cap includes at least one other aperture disposed between said second seal and said third seal for providing a fluid path to a radially-inner portion of said filter media.

7. The filter element as in claim 1, wherein said cylindrical portion of said second end cap defines an opening having a geometric surface configuration which cooperates with a geometric surface configuration on the post to locate the filter element around the post and prevent the filter element from rotating around the post.

8. A filter element, comprising:
    i) tubular filter media having first and second ends and circumscribing a central cavity,
    ii) a first end cap disposed at one end of said filter media, said first end cap including a base portion supporting the one end of said filter media and a portion extending inwardly into said cavity of said filter media, and at least one aperture formed in said first end cap for providing a fluid path through said first end cap to a radially outer portion of said filter media, and at least one other aperture formed in said first end cap for providing a second fluid path through said first end cap to a radially inner portion of said filter media,
    iii) a second end cap disposed at the other end of said filter media, said second end cap also including a base portion supporting the other end of said filter media and a portion extending inwardly into said cavity of said filter media, at least one of said portions of said first and second end caps extending inwardly into said cavity providing an annular groove facing radially inward, and
    iv) a first resilient seal disposed in said groove.

9. The filter element as in claim 8, wherein the portions of the first and second end caps extending inwardly into said cavity cooperate to define an internal cavity fluidly separated from the radially inner portion of the filter media.

10. The filter element as in claim 9, further including an annular flange extending axially away from said first end cap, and a second resilient seal associated with said flange.

11. The filter element as in claim 10, wherein a third resilient seal is disposed about the periphery of said base portion of said first end cap.

12. The filter element as in claim 11, wherein said portions of said first and second end caps extending inwardly into said cavity axially overlap.

13. The filter element as in claim 12, wherein said portions of said first and second end caps extending inwardly into said cavity cooperate to define said groove for said first seal.

14. A filter assembly, comprising:
    a filter housing having a container defining a main cavity with an open upper end and a cover enclosing the open upper end, said container including a lower base having a post extending upward centrally within the container, and
    a filter element disposed in said main cavity of said container, said filter element including:

i) filter media having upper and lower ends and circumscribing a central cavity, ii) a first end cap disposed at one end of said filter media, said first end cap including a base portion supporting the one end of said filter media and a cylindrical portion extending into said cavity of said filter media, said base portion including a peripheral portion with a first groove extending around the periphery of the end cap and a first seal disposed in said first groove, said first seal also being disposed between the container and the cover for providing a fluid seal therebetween, said first end cap further including an annular flange extending upwardly from said base and having a second groove and a second seal disposed in said second groove, said cover having a corresponding flange extending downwardly from said cover, and said second seal being disposed between said flange of said base and said flange of said cover for providing a fluid seal therebetween, and at least one aperture formed in said base for providing a fluid path between said cover and a radially outer surface of said filter media, and iii) a second end cap disposed at the other end of said filter media, said second end cap also including a base portion supporting the other end of said filter media and a cylindrical portion extending into said cavity of said filter media, said first and second cylindrical portions cooperating to define an internal cylindrical chamber surrounding said post, a third groove associated with said at least one of said cylinders of said first and second end caps facing radially inwardly, and a third seal in said third groove, said third seal being disposed between said cylinders of said first and second end caps and said post for providing a fluid seal between the end caps and the post.

15. The filter assembly as in claim 14, wherein said cylindrical portion of said second end cap includes a geometric configuration which cooperates with a geometric configuration of said post to locate the filter element around the post and prevent the filter element from rotating with respect thereto.

16. A filter assembly, comprising a filter housing having a container defining a main cavity with an open upper end and a cover enclosing the open upper end, said container including a lower end having a post extending upward toward the open end centrally within the container, said post including a hollow bore extending centrally through the post from the lower end of the container, and a fastening device is received within said bore and extends upwardly within said post to said cover to fixedly secure said cover to said container, and a filter element disposed in said main cavity of said container, said filter element including:

i) filter media having upper and lower ends and circumscribing a central cavity, ii) a first end cap disposed at one end of said filter media, said first end cap including a base portion supporting the one end of said filter media and a cylindrical portion extending into said cavity of said filter media, and iii) a second end cap disposed at the other end of said filter media, said second end cap also including a base portion supporting the other end of said filter media and a cylindrical portion extending into said cavity of said filter media, said cylindrical portions of said first and second end caps cooperating to define an internal cylindrical chamber for said post, a groove associated with at least one of said cylindrical portions of said first and second end caps facing radially inward and an O-seal disposed in said groove, said O-seal being disposed between said cylindrical portions of said first and second end caps and said post for providing a fluid seal between the upper and lower end caps and the post of the filter housing.

17. The filter assembly as in claim 16, wherein said bore of said post includes an inner surface configuration which cooperates with a surface configuration of said fastening device to locate said fastening device in said bore and prevent said fastening device from rotating in said bore.

18. The filter assembly as in claim 17, wherein said post also has an outer surface configuration, and said cylinder of said second end cap has an opening for receiving said post, said opening also having an inner surface configuration which cooperates with said surface configuration of said post to locate said cylinder around said post and prevent said filter element from rotating with respect to said post.

19. The filter assembly as in claim 18, wherein said outer surface configuration of said post is substantially the same as said inner surface configuration of said bore, said outer surface configuration of said post extends from the lower end of the container to a predetermined axial point along the post, said post having a substantially smooth annular exterior surface axially above said predetermined point, said seal being located between said cylindrical portions of said first and second end caps and in sealing relationship with said post at an axial location above the predetermined point along the post.

20. The filter assembly as in claim 19, wherein said fastening device comprises a bolt with a head having a hexagonal shape and the bore in the post has a corresponding hexagonal shape which prevents the bolt from rotating in the bore.

21. The filter assembly as in claim 20, wherein said bolt extends through said post and has a distal end which extends through an aperture formed in said cover, and a nut is received about the distal end of the bolt to fasten the cover to the container.

22. A filter element, comprising:

i) tubular filter media having first and second ends and circumscribing a central cavity, ii) a first end cap disposed at one end of said filter media, said first end cap including a base portion supporting the one end of said filter media, said base portion including a first annular groove around the periphery thereof facing radially outward, a first resilient seal disposed within said first groove, an annular flange extending upwardly away from said base portion with a second annular groove in a surface thereof, a second resilient seal disposed within said second groove, and at least one aperture formed in said first end cap for providing a fluid path through said first end cap to a radially outer surface portion of said filter media, iii) a second end cap disposed at the other end of said filter media, said second end cap also including a base portion supporting the other end of said filter media and a cylindrical portion extending inwardly into said central cavity of said filter media, said cylindrical portion defining at least a portion of a third annular groove facing radially inward, and iv) a third resilient seal disposed in said third groove.

23. A replaceable filter element for a filter housing having an outer container with an first open end, a projection extending centrally within the container from a second closed end toward the first open end, and a cover for enclosing the first open end, said filter element comprising:

i) tubular filter media having first and second ends and circumscribing a central cavity, said filter media designed to be disposed within said housing with the first end of the filter media disposed toward the first end of the container and the second end of the filter media disposed toward the second end of the container, ii) a first end cap disposed at said first end of said filter media, said first end cap including an annular base portion having a first surface secured to the first end of said filter media, an annular flange extending away from a second, opposite surface of said base portion for sealing with the cover and for fluidly separating a radially outer surface of the filter media from a radially inner surface of the filter media across the first end cap, and an end cap portion integral with and extending from a radially-inner portion of said base portion inwardly into the central cavity of said filter media for engaging the central projection, said end cap portion including an aperture, whereby a flow path is provided from said radially outer surface through said media to said radially inner surface and through said aperture in said end cap portion, and iii) a second end cap disposed at the second end of said filter media, said second end cap also including an annular base portion having a first surface secured to the second end of said filter media and a cylindrical portion extending from a radially inner portion of said base portion of said second end cap inwardly into said central cavity of said filter media for sealing with the central projection.

24. The filter element as in claim 23, wherein said cylindrical portion of said second end cap includes a resilient annular seal at a distal end thereof for sealing against the central projection.

25. The filter element as in claim 23, wherein said end cap portion of said first end cap comprises a cylindrical portion, with a distal end thereof engaging the central projection.

* * * * *